United States Patent
Comeau

[19]

[11] Patent Number: 6,145,720
[45] Date of Patent: Nov. 14, 2000

[54] VEHICLE CARGO CARRIER

[76] Inventor: Serge Comeau, 25, rue Emilia, Victoriaville, QC, Canada, G6P 6R8

[21] Appl. No.: 09/079,031

[22] Filed: May 15, 1998

[51] Int. Cl.$^7$ .................................. B60R 7/00; B60R 9/00
[52] U.S. Cl. ............................ 224/521; 224/282; 224/527; 224/532; 224/924
[58] Field of Search .................... 224/502, 504, 224/505, 506, 521, 526, 527, 529, 530, 532, 282, 924

[56] References Cited

U.S. PATENT DOCUMENTS

| | | |
|---|---|---|
| 3,734,272 | 5/1973 | Galen . |
| 3,871,546 | 3/1975 | Thompson . |
| 3,949,528 | 4/1976 | Hartger et al. . |
| 4,149,634 | 4/1979 | Lewis, Jr. . |
| 4,353,464 | 10/1982 | Bentler . |
| 4,378,883 | 4/1983 | Profeta . |
| 4,390,088 | 6/1983 | Brenner . |
| 4,756,416 | 7/1988 | Johnson . |
| 4,892,190 | 1/1990 | Delgado . |
| 5,106,002 | 4/1992 | Smith et al. ........................ 224/527 |
| 5,460,304 | 10/1995 | Porter . |
| 5,544,799 | 8/1996 | Didlake . |
| 5,586,702 | 12/1996 | Sadler . |

*Primary Examiner*—Joseph M. Moy

[57] ABSTRACT

This carrier is designed to be supported at the back of a vehicle by means of the receiver tube of a trailer hitch. The carrier comprises a frame having a U-shape portion releasably attached to a support member via a T-shaped sleeve with a main upwardly extending leg releasably attached to the middle of the bight of the U-shape frame a transverse leg inserted into the support member, itself and inserted into the receiver tube of the hitch. The two legs of the frame rearwardly extend from the vehicle and a cargo receiving container is pivoted to the rear ends of the frame legs for swinging movement between an upright transport position in which the container rests on and is supported by the frame and a tilted position rearwardly of the legs and clearing the frame to permit access to the back of the vehicle. The container is designed to house several fully assembled bicycles side by side with the bicycle frame and rear wheels parallel to the front wall of the container but with the front wheels and steering handles inclined relative to said front wall so that the container has a minimum of width transverse to the vehicle.

11 Claims, 5 Drawing Sheets

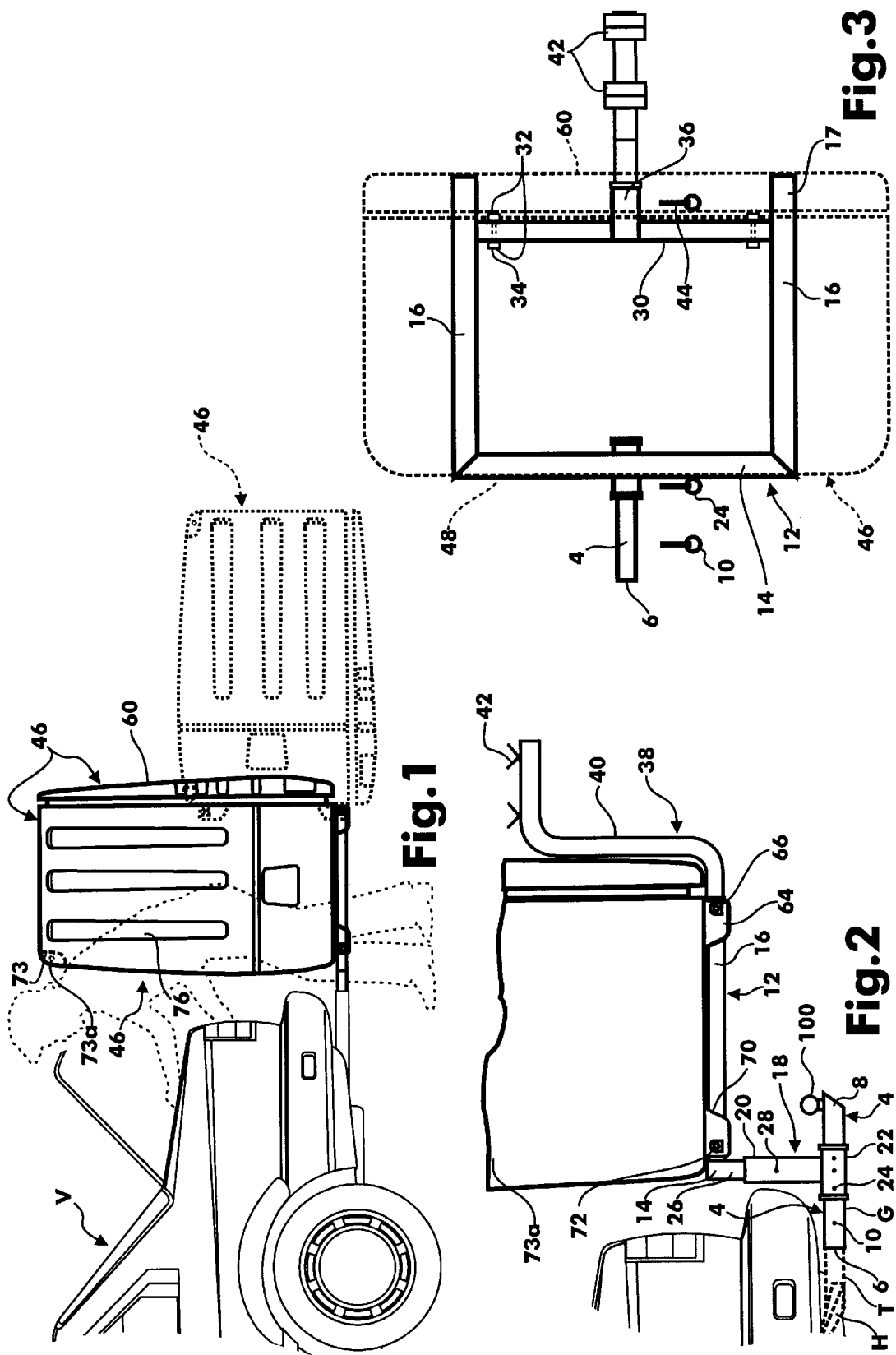

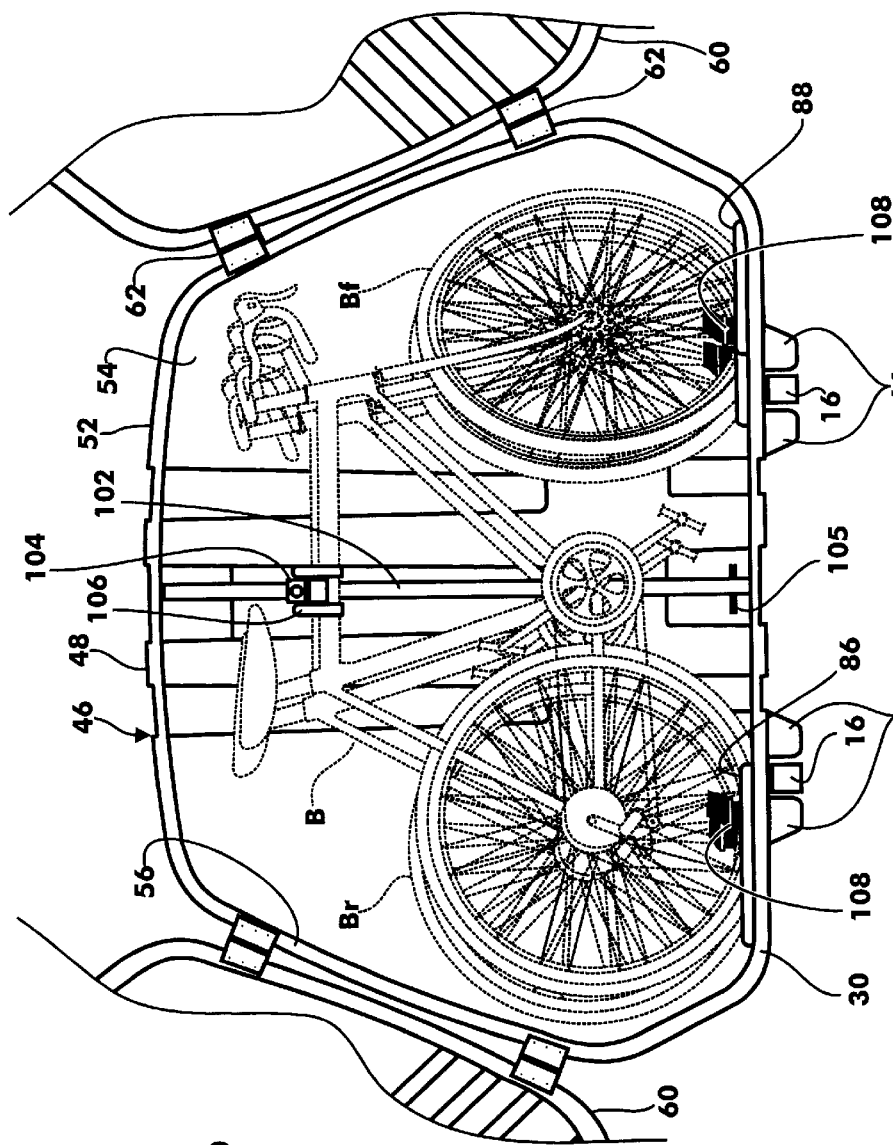
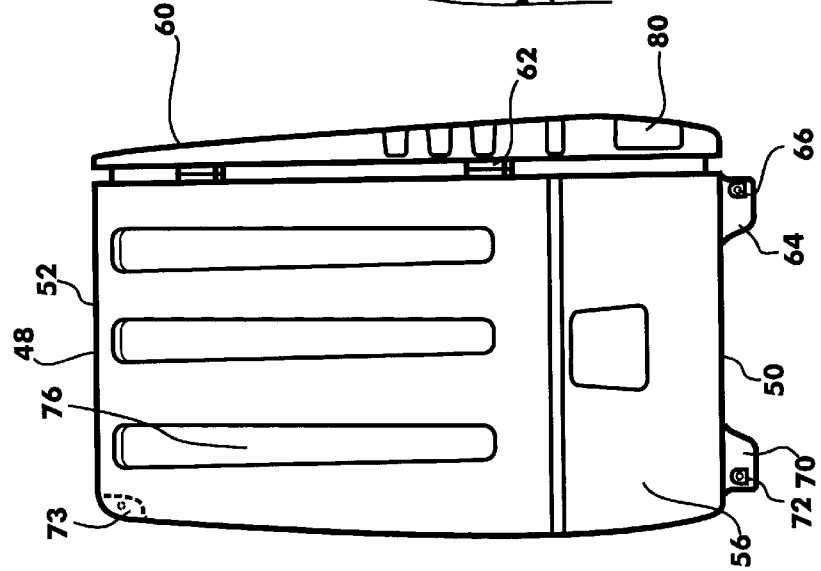

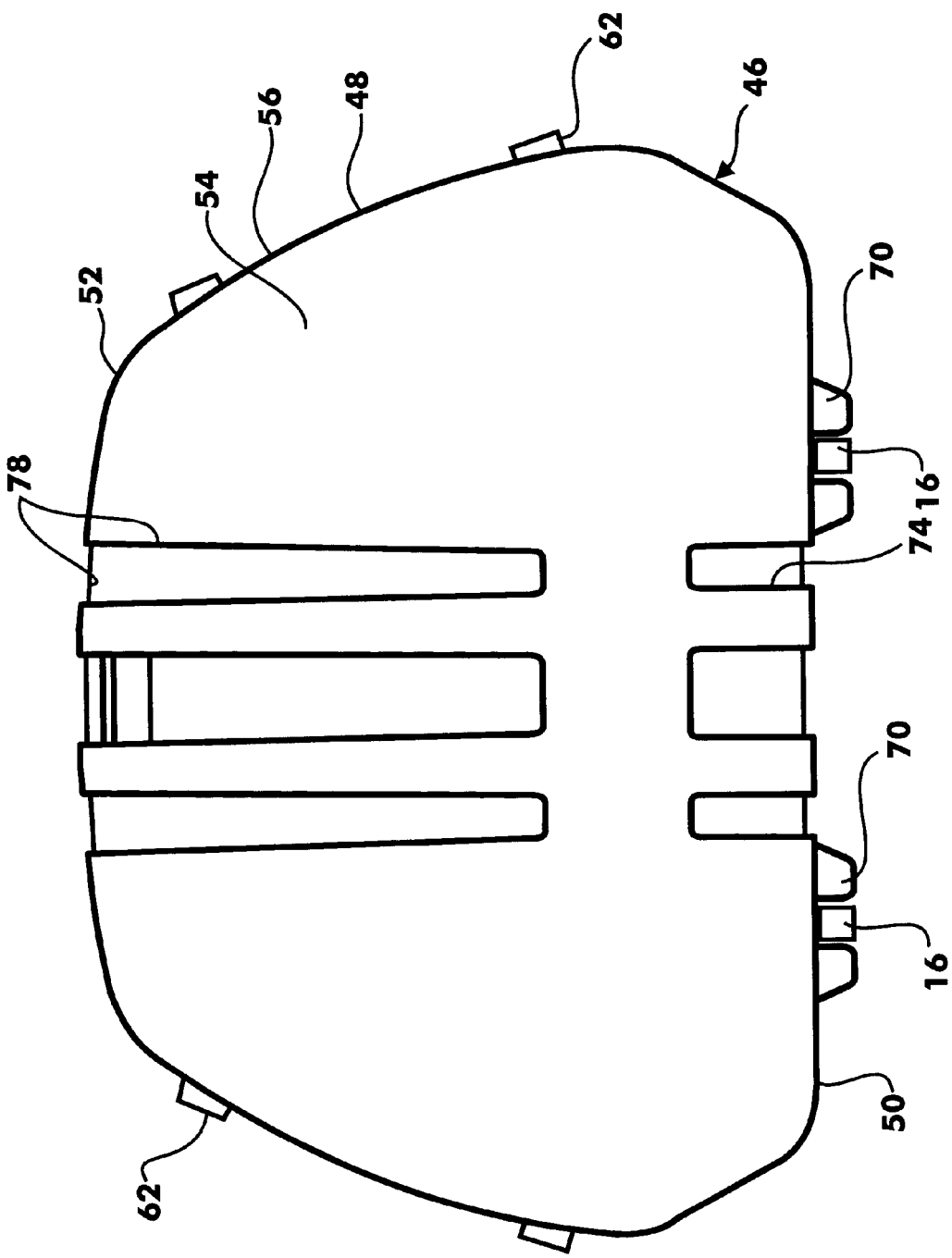

VEHICLE CARGO CARRIER

FIELD OF THE INVENTION

The present invention relates to a carrier for attachment to the rear portion of a vehicle via a receiver type trailer hitch. The carrier supports a container, preferably a container for bicycles.

BACKGROUND OF THE INVENTION

It is known to provide cargo carriers of the above-mentioned type in which the container is movable to an inoperative out-of-the-way position so as to enable the vehicle user to have access to the rear trunk or hatch door of the vehicle.

In U.S. Pat. No. 5,544,799 dated Aug. 13, 1996, inventor Ralph L. Didlake, entitled SWING AWAY CARGO CARRIER ASSEMBLY, the carrier 20 for a cargo container is laterally swingable from an operative position at the back of the vehicle to a side position in which the carrier and the container mounted thereon extend over the side of the vehicle so as to form an obstruction to the passage of other vehicles. Furthermore, the weight of the cargo exerts a downward force at the outer end of a transverse arm secured to the centrally mounted hitch receiver tube, thereby producing considerable torsion on the latter which might result in its breakage.

In U.S. Pat. No. 5,586,702 dated Dec. 24, 1996, inventor William R. Slader, entitled VEHICLE CARGO CARRIER, there is also described a container carrier which is supported by the centrally mounted receiver hitch tube of a vehicle and in which the carrier frame is longitudinally movable from an advanced position close to the back of the vehicle to a rearmost position to gain access to the vehicle hatch door or trunk lid. For this purpose, the carrier frame is telescopically mounted on a support member which requires expensive roller bearings indicated at 47A and 47B to reduce frictional resistance.

Furthermore, in its limit rearward position, the loaded cargo container exerts a considerable downward torque on the hitch receiver tube of the vehicle which might result in its breakage.

There is also known bicycle containers such as described in U.S. Pat. No. 4,378,883 dated Apr. 5, 1983, inventor Joseph G. Profeta, entitled BICYCLE CARRYING CASE and in U.S. Pat. No. 4,892,190 dated Jan. 9, 1990, inventor Charles B. Delgado, entitled BICYCLE CASE. However, the containers described in these patents can only contain a single bicycle in partially disassembled state. These containers are therefore not designed to house several bicycles disposed side by side and in fully assembled condition ready to be used.

U.S. Pat. No. 4,378,883 shows that the case can be supported at the back of a vehicle by a standard bike rack. However, such a carrier could not support a case containing several bicycles since the weight would be too great.

OBJECTS OF THE PRESENT INVENTION

It is therefore the main object of the present invention to provide a cargo carrier which will obviate the above-noted disadvantages.

Another object of the present invention is to provide a cargo carrier supporting a cargo container which itself can be pivoted to a rearwardly tilted postion with respect to the carrier frame in which it rests on the ground and clears a space at the back of the vehicle to gain access to the vehicle rear hatch or trunk lid.

Another object of the present invention is to provide a cargo container specially designed to house several fully assembled bicycles disposed side by side and in such a position that the container occupies a minimum of space transversely of the vehicle.

Another object of the present is to provide a bicycle transport system of the character described which is relatively inexpensive to build and which does not exert lateral torsion on the trailer hitch receiver tube.

SUMMARY OF THE INVENTION

The cargo carrier of the present invention is for attachment to a rear portion of a vehicle via a receiver type trailer hitch including a receiver tube of non-circular cross-section located in the central vertical plane of said vehicle, said carrier comprising a support member having a rear portion and a front portion sized and shaped for releasable insertion into said receiver tube, first retainer means to releasably retain said front portion of said support member within said receiver tube, a frame including a U-shape portion formed by a bight and a pair of legs, said bight extending transversely of and fixed to said rear portion of said support member, said legs extending rearwardly of said bight and parallel to and equally laterally spaced from said support member, each leg having a rear free end, said frame arranged to be horizontally disposed and cantilevered from said support member when the latter is inserted and retained into said receiver tube, a cargo receiving container and pivot means pivoting said container to the rear ends of said legs about a pivot axis parallel to said bight for pivotal tilting movement of said container between an upright transport position resting on and supported by said frame and a tilted position rearwardly of said legs and clearing said frame to permit access to the rear portion of said vehicle.

The container includes a body formed by a bottom wall, a top wall, a front wall and side walls, said container having a back opening and a pair of doors hinged to said container and closing said back opening, said bottom wall resting on said legs when said container is in said transport position.

Preferably, ears downwardly extend from said bottom wall near said back opening and pivot pins extending through said ears and through said rear ends of said legs and co-axial with said pivot axis.

Preferably, there is a second retainer means to releasably retain said container in said transport position.

Preferably, said second retainer means includes additional ears downwardly extending from said bottom wall near said front wall and overlapping said legs in said transport position and locking pins releasably inserted through said additional ears and through said legs.

Preferably, there is releasable fixing means to fix the bight to said rear portion of said support member including a T-shaped sleeve defining a main leg and a transverse leg sized and shaped to slidably fit around said rear portion of said support member with said main leg upwardly extending from said support member, and a connector member secured to the center of said bight and downwardly extending therefrom and releasably inserted within said main leg of said T-shaped sleeve whereby said U-shape portion of said frame is disposed above said receiver tube.

Preferably, a cross-member releasably secured to the rear ends of said legs and a receiver tube centrally secured to said cross-member and normal thereto to removably receive and support a bike rack, the latter having an upright portion engaging and staying the back of said container in its transport position.

Preferably, there is a releasable fixing means to fix said bight to said rear portion of said support member including a T-shaped sleeve defining a main leg and a transverse leg sized and shaped to slidably fit around said rear portion of said support member with said main leg upwardly extending from said support member, and a connector member secured to the center of said bight downwardly extending therefrom and releasably inserted within said main leg of said T-shaped sleeve whereby said U-shape portion of said frame is disposed above said receiver tube.

Preferably, the carrier further includes a cross-member releasably secured to the rear ends of said legs and a receiver tube centrally secured to said cross-member and normal thereto to removably receive and support a bike rack, the latter having an upright portion engaging and abutting said doors when closed and stating with said container in its transport position.

Preferably, the container body is sized and shaped to receive several fully assembled bicycles disposed side by side with their bicycle frames and rear wheels parallel to said front wall and with their front wheels and steering handles equally laterally inclined towards said front wall relative to said bicycle frames and rear wheels.

Preferably, the container body includes first and second sets of parallel pairs of bicycle wheels guiding ribs made in said bottom wall and respectively parallel to and inclined relative to said front wall for respectively guiding the rear and front wheels of said bicycles.

Preferably, the container body and the doors are formed of a thermoplastic by a vacuum-forming process and include reinforcing ribs in said front, top and side walls and in said doors, and said doors further having recesses for receiving tail lights and a license plate.

Preferably, there are sealing means to seal said doors when closed, between each other and with said container body.

BRIEF DESCRIPTION OF THE DRAWINGS

In the annexed drawings, like reference characters indicate like elements throughout.

FIG. 1 is a side elevation of the cargo carrier of the present invention mounted at the back of a vehicle and showing the cargo container in upright transport position; and in a partially tilted position shown in dotted lines;

FIG. 2 is a side elevation of the assembly of the carrier frame and accessories;

FIG. 3 is a top plan view of the assembly of FIG. 2;

FIG. 5 is a side elevation of the bicycle container;

FIG. 6 is a back elevation of the bicycle container with the back doors in fully opened position;

FIG. 7 is a front elevation of the bicycle container;

DETAILED DESCRIPTION OF THE PREFERRED EMBODIMENT

Figure 4:
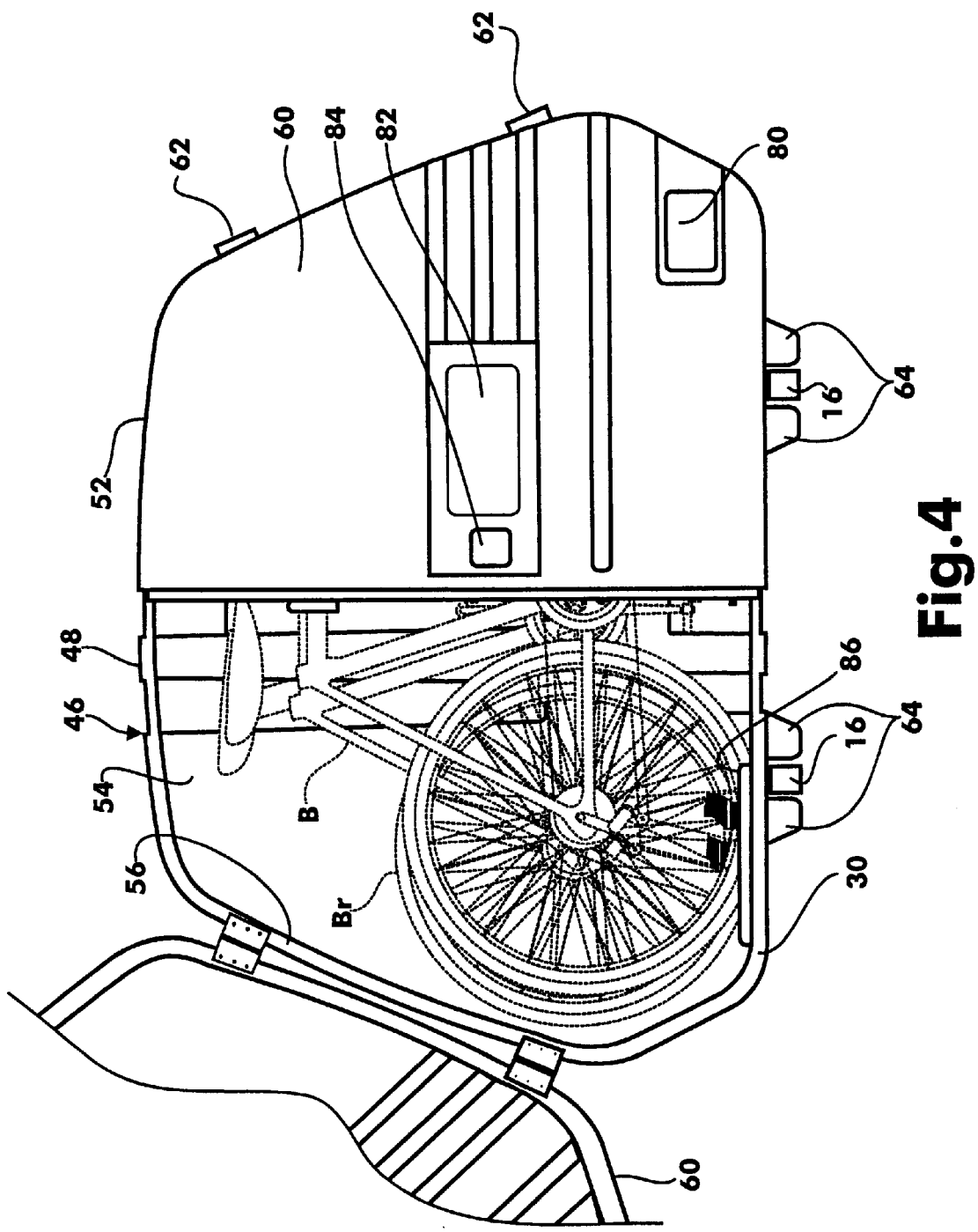
FIG. 4 is a back elevation of the bicycle container.
Figure 10:
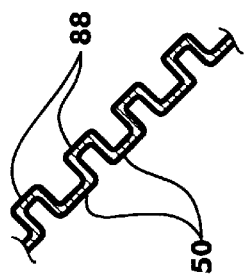
FIGS. 9 and 10 are partial cross-sections of the bottom wall taken along lines 9—9 and 10—10 respectively of FIG. 8.

FIG. 1 shows the back of a vehicle V, such as a passenger car provided with a trunk lid C. Vehicle V could be a minivan or the like with a back hatch door. The rear portion of the vehicle V is fitted with a trailer hitch H including a centrally mounted receiver tube T. The carrier 2 of the invention is designed to be supported by the receiver tube T of the hitch H.

The carrier 2 includes a support member 4, the front portion 6 of which is sized and shaped to be inserted within the receiver tube T in non-rotatable fashion and with its rear portion 8 extending longitudinally rearwardly of the vehicle V in the vertical central plane of the same. Support member 4 is retained within receiver tube T by a locking pin 10. The carrier 2 further includes a frame 12 of U-shape including a transverse bight 14 and two longitudinally and rearwardly extending straight legs 16. A T-shaped sleeve member 18 has a main leg 20 and a transverse leg 22, the latter being of non-circular cross-sectional shape and of a size to slideably fit on the rear portion 8 of the support member 4. The main leg 20 extends upwardly. The sleeve member 18 is locked on support member 4 by a locking pin 24.

A connector member 26 is welded or otherwise secured to the center of bight 14 and is normal to the plane of frame 12, downwardly extends therefrom and is slideably fitted within the upright main leg 20 of sleeve member 18. A locking pin 28 removeably secures connector member 26 within main leg 20.

A cross-member 30 is removeably secured to the rear ends 17 of legs 16, being secured thereto by insertion between a pair of plates 32 secured to rear ends 17 with bolts 34 removeably secured across member 30 and plates 32.

A receiver tube 36 is secured to the center of the cross-member 30 and opens rearwardly in the center of the carrier frame 12. A bike rack 38 can be supported within tube 36, being formed with an upright portion 40 and V-shaped cradles 42 for supporting two bicycles. The bike rack 38 is removeably locked within tube 36 by a locking pin 44.

A container 46 is mounted on the carrier frame 12. Body 48 of container 46 has a bottom wall 50, a top wall 52, a front wall 54, side walls 56 and a full size back opening 58 closeable by a pair of doors 60 hinged to the side walls 56 by means of hinges 62.

Bottom wall 50 is formed with downwardly extending rear pivot ears 64 straddling the rear ends 17 of the respective legs 16 and pivotally connected thereto by pivot pins 66. The bottom wall 50 of the container body 48 is further provided with front ears 70 adapted to straddle and overlap the front portion of the legs 16 and to be removeably secured thereto by locking pins 72. Top wall 52 is also provided with top ears 73 with openings 73a for receiving the hook of guy wires and the like such as elastic bands, the other ends of which to be secured to the rear of vehicle V. This constitutes a safety feature in addition to locking pins 72 and ears 70 to positively maintain the container 46 in upright position on the frame 12 during transport.

Container 46 is preferably made of synthetic resin in a vacuum forming process.

To reinforce its walls, reinforcing inner ribs 74 are formed in the bottom and front wall of container body 48 while ribs 76 and 78 are formed in side walls 56 and in front wall 54 and top wall 52 respectively.

The doors 60 are provided with recesses 80 for receiving tail lights and a recess 82 for receiving a license plate.

Doors 60 are closed by means of a door latch 84.

Container 46 is sized and shaped for receiving several, for instance two, bicycles disposed side by side and in fully assembled position. Two bicycles are shown at B in FIG. 6.

Figure 8:
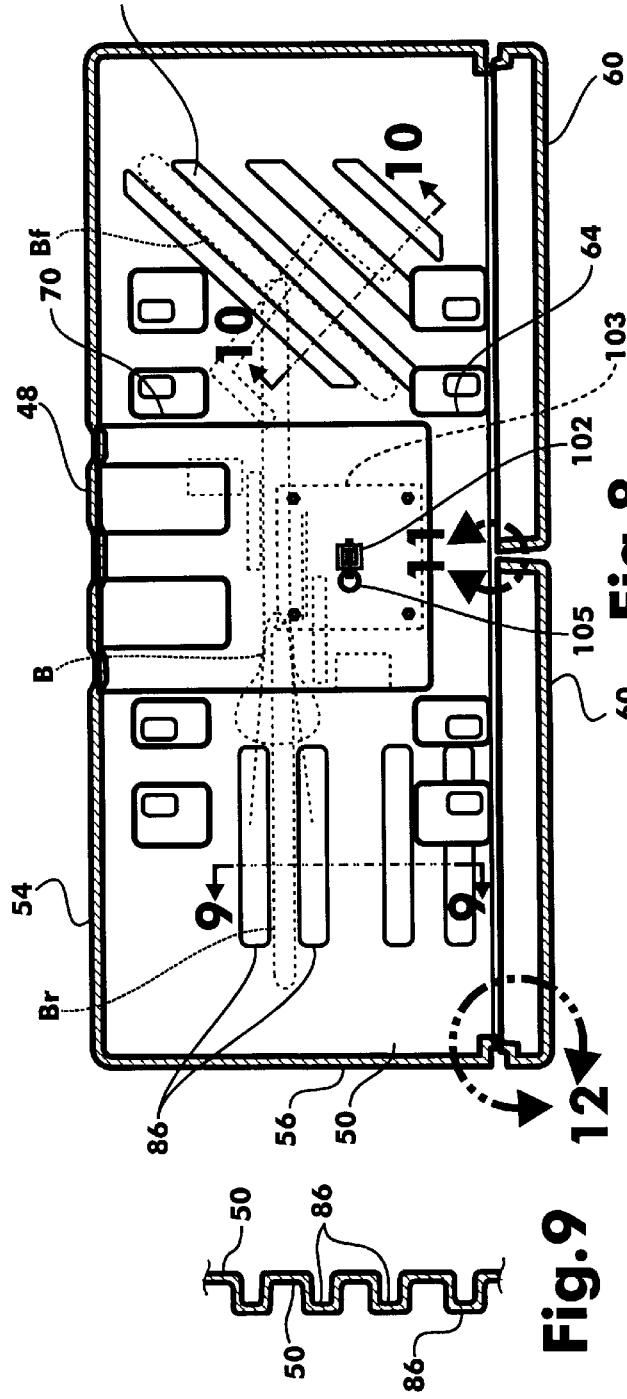
FIG. 8 is an inside top plan view of the bottom wall of the bicycle container.
Figure 9:
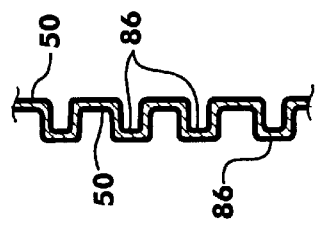

All the bicycle frames and rear wheels Br are parallel to front wall 54 of container body 48. Rear bicycle wheels Br are received and firmly located between pairs of spaced, parallel ribs 86 formed in the bottom wall 50 as shown in FIGS. 8 and 9 which are all parallel to front wall 54. In order to reduce the width of the box to a minimum, the front wheels Bf of the bicycles are inclined with respect to the rear wheels Br and bicycle frames and are received between pairs of front wheel locating ribs 88 formed in bottom 50 and which are all equally inclined relative to front wall 54.

The bicycles B are firmly stayed within the container body 48 by retaining means which can include a post 102 removably secured to bottom wall 50 by a base plate 103 with a pin 105 and removably engaged into the top wall 52 by a simple means for attachment and, a slide member 104 fitted with bicycle frame engaging hook 106 and adjustable on post 102. The retaining means may further include elastic bands or Velcro (trademark) straps 108 for surrounding the bicycle wheel rims and secured to the pivot pins 66 and retaining pins 72 inside the vacuum formed hollow ears 64 and 70.

Figure 12:
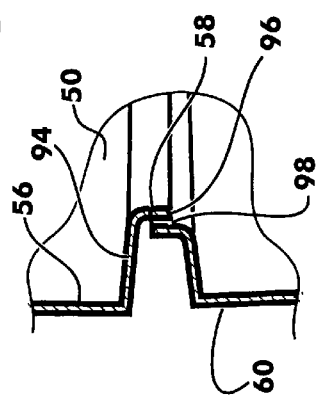
FIGS. 11 and 12 are enlarged views taken in areas 11 and 12 of FIG. 9 respectively.
Figure 11:
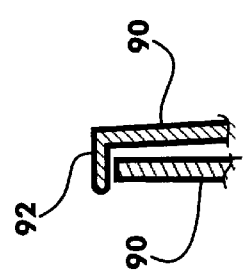

Doors 60 form a waterproof seal with the container body 48 when in closed position. For this purpose, as shown in FIG. 11, one of the two door flanges 90, which meet with each other at the centre of the container when the doors are closed, is provided with a lip 92 overlapping the flange 90 of the other door. Also, as shown in FIG. 12, the in-turned flange 94 extending from the side wall 56 forming the back opening 58 has a lip 96 which overlaps a lip 98 of the adjacent door 60.

As shown in FIG. 1, the support member 4 can be provided at its rear portion 8 with a removeable trailer hitch ball 100 of standard construction.

Therefore, when there is no need to install the cargo carrier of the invention at the back of vehicle V, the sleeve member 18 can be detached from the support member 4 and the latter provided with hitch ball 100 to attach a trailer to the vehicle in conventional manner.

When the cargo carrier, preferably with the bicycle container of the invention, is to be used, the hitch ball 100 is removed and the T-shape sleeve 18 is installed on the support member 4 and locked in position; connector member 26 of frame 12 is inserted into vertical leg 20 of the T-shape sleeve member 18 as previously described and the container 46 is attached to the rear ends of frame legs 16 by the pivot pins 66.

With the container 46 in upright transport position, bicycles can be loaded within the container body 48 in the manner previously described and once the doors 60 are closed and latched, bike rack 38 can be installed in the receiver tube 36 and locked therein by locking pin 44. Therefore, additional bicycles can be transported.

The upright portion 40 of the bike rack abuts against the closed doors 60, therefore to form an additional safety feature to prevent accidental opening of the doors 60 during transport. This safety is in addition to the front locking pins 72 and to the retaining straps attached to the ears 73 if this is found necessary.

Whenever access to the container is desired, bike rack 38 must be removed to open doors 60 and load or unload bicycles or other type of cargo.

Whenever access to the rear of vehicle V is required, for instance to be able to open trunk lid C and have access to the car trunk, bike rack 38 locking pins 72 and straps attached to ears 73 are removed so that, as shown in FIG. 1, container 46 may be bodily pivoted about rear pivot pins 66 to the partially tilted position shown in dotted lines in FIG. 1, in which container 46 is retained by a cable (not shown) attached to ears 73 or 70 and to vehicle V or to a fully tilted position at the back of the legs 16 of the carrier frame with the box resting on the pavement or ground at its top portion. It is noted that, in this fully tilted position, a great part of the weight of the load is directly supported by the ground and not by the rear ends of the frame legs 16. Therefore, a minimum of flexing force is exerted on the support member 4 and, consequently, on the hitch H.

In either tilted positions of the container 46, the latter does not protrude laterally from the space occupied by the container when in upright transport position.

In either tilted or upright container positions, no torsion is exerted on hitch H.

I claim:

1. A cargo carrier for attachment to a rear portion of a vehicle via a receiver type trailer hitch including a receiver tube of non-circular cross-section located in the central vertical plane of said vehicle, said carrier comprising a support member having a rear portion and a front portion sized and shaped for releasable insertion into said receiver tube, first retainer means to releasably retain said front portion of said support member within said receiver tube, a frame including a U-shape portion formed by a bight and a pair of legs, said bight extending transversely of and fixed to said rear portion of said support member, said legs extending rearwardly of said bight and parallel to and equally laterally spaced from said support member, each leg having a rear free end, said frame arranged to be horizontally disposed and cantilevered from said support member when the latter is inserted and retained into said receiver tube, a cargo receiving container and pivot means pivoting said container to the rear ends of said legs about a pivot axis parallel to said bight for pivotal tilting movement of said container between an upright transport position resting on and supported by said frame and a tilted position rearwardly of said legs and clearing said frame to permit access to the rear portion of said vehicle, a releasable fixing means to fix said bight to said rear portion of said support member including a T-shaped sleeve defining a main leg and a transverse leg sized and shaped to slidably fit around said rear portion of said support member with said main leg upwardly extending from said support member, and a connector member secured to the center of said bight and downwardly extending therefrom and releasably inserted within said main leg of said T-shaped sleeve whereby said U-shape portion of said frame is disposed above said receiver tube.

2. A cargo carrier as defined in claim 1, wherein said container includes a body formed by a bottom wall, a top wall, a front wall and side walls, said container having a back opening and a pair of doors hinged to said container and closing said back opening, said bottom wall resting on said legs when said container is in said transport position, ears downwardly extending from said bottom wall near said back opening and pivot pins extending through said ears and through said rear ends of said legs and co-axial with said pivot axis.

3. A cargo carrier as defined in claim 2, further including second retainer means to releasably retain said container in said transport position.

4. A cargo carrier as defined in claim 3, wherein said second retainer means includes additional ears downwardly extending from said bottom wall near said front wall and overlapping said legs in said transport position and locking pins releasably inserted through said additional ears and through said legs.

5. A cargo carrier as defined in claim 1, further including a cross-member releasably secured to the rear ends of said legs and a receiver tube centrally secured to said cross-member and normal thereto to removably receive and support a bike rack, the latter having an upright portion engaging and abutting the back of said container in its transport position.

6. A cargo carrier as defined in claim 2, wherein said container body is sized and shaped to receive several fully assembled bicycles disposed side by side with their bicycle frames and rear wheels parallel to said front wall and with their front wheels and steering handles equally laterally inclined towards said front wall relative to said bicycle frames and rear wheels.

7. A cargo carrier as defined in claim 6, further including first and second sets of parallel pairs of bicycle wheels guiding ribs made in said bottom wall and respectively parallel to and inclined relative to said front wall for respectively guiding the rear and front wheels of said bicycles.

8. A cargo carrier as defined in claim 7, wherein said container body and said doors are formed of a thermoplastic by a vacuum-forming process and include reinforcing ribs in said front, top and side walls and in said doors, and said doors further having recesses for receiving tail lights and a license plate.

9. A cargo carrier as defined in claim 8, further including sealing means to seal said doors when closed, between each other and with said container body.

10. A cargo carrier as defined in claim 6, further including a cross-member releasably secured to the rear ends of said legs and a receiver tube centrally secured to said cross-member and normal thereto to removably receive and support a bike rack, the latter having an upright portion engaging and abutting said doors when closed and staying with said container in its transport position.

11. A cargo carrier as defined in claim 10, wherein said container body and said doors are formed of synthetic resin by a vacuum-forming process and includes reinforcing ribs in said front, top and side walls and in said doors, said doors further having recesses for receiving tail lights and a license plate.

* * * * *